(No Model.) 2 Sheets—Sheet 1.

M. G. HUBBARD.
TORSION SPRING.

No. 423,157. Patented Mar. 11, 1890.

Attest:
Geo. T. Smallwood.
Jas. K. McCathran.

Inventor:
Moses G. Hubbard.
By A. M. Smith & Son.
Attorneys.

(No Model.) 2 Sheets—Sheet 2.

M. G. HUBBARD.
TORSION SPRING.

No. 423,157. Patented Mar. 11, 1890.

Attest:
Geo. T. Smallwood.
Jas. L. McCattman

Inventor:
Moses G. Hubbard,
By A. M. Smith & Son,
Attorneys.

UNITED STATES PATENT OFFICE.

MOSES G. HUBBARD, OF PHILADELPHIA, PENNSYLVANIA.

TORSION-SPRING.

SPECIFICATION forming part of Letters Patent No. 423,157, dated March 11, 1890.

Application filed December 18, 1888. Serial No. 293,934. (No model.)

*To all whom it may concern:*

Be it known that I, MOSES G. HUBBARD, of Philadelphia, county of Philadelphia, and State of Pennsylvania, have invented a new and useful Improvement in Torsion-Springs, of which the following is a full, clear, and exact description, reference being had to the accompanying drawings, making part of this specification.

My invention consists in certain improvements in springs for wheeled vehicles and their combination therewith in such manner as to attain a more perfect vibratory connection between the body and wheels with great strength and safety.

My invention will be understood by reference to the drawings hereto attached, forming a part of this specification, in which—

Figure 1:
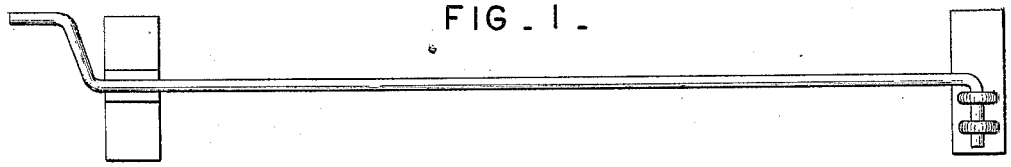
Figure 2:
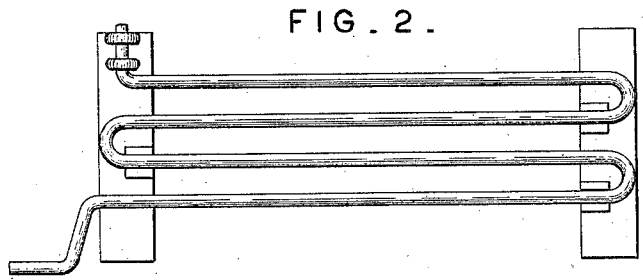
Figure 3:
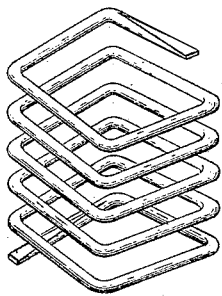
Figure 4:
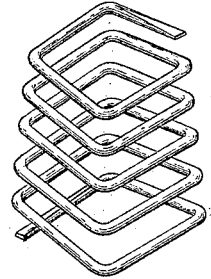
Figure 5:
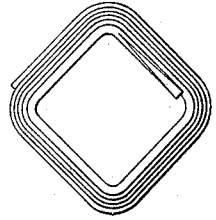
Figure 7:
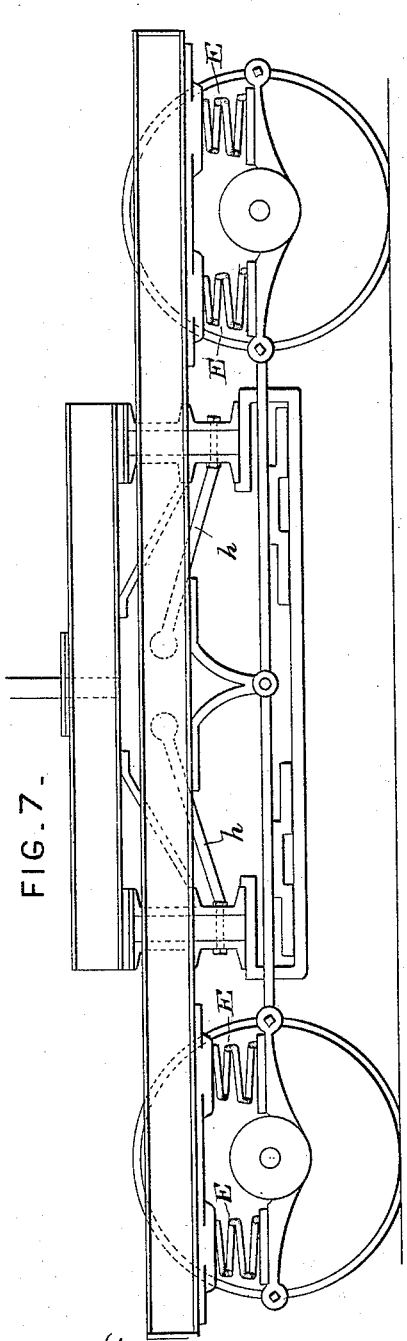
Figure 6:
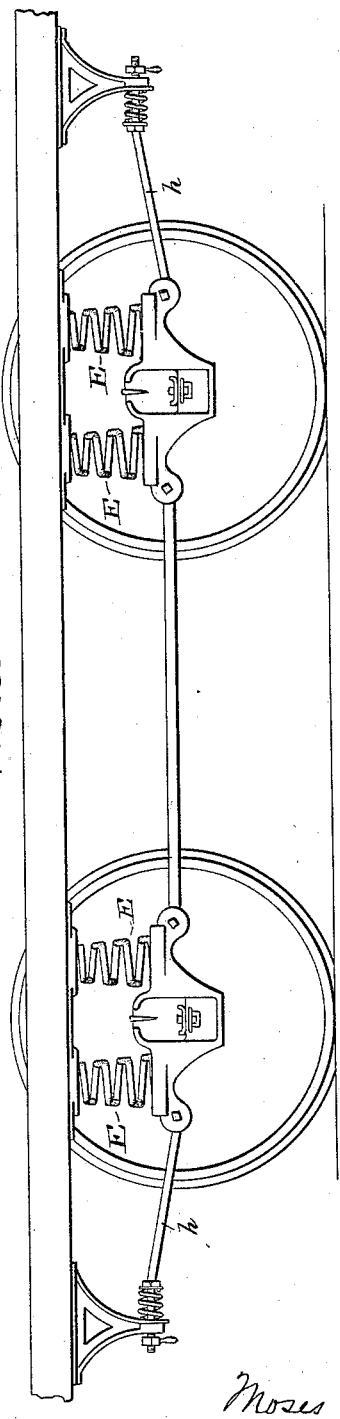

Figure 1 shows the form of my first torsion-spring hereinafter referred to. Fig. 2 shows my improvement thereon, hereinafter referred to as my patent recurved torsion-spring. Fig. 3 shows my torsion-spring made in the form of alternate straight sections and recurvatures, with the straight sections inclined in such manner as to adapt the spring to occupy the least possible space and to operate without journals or pivots. Fig. 4 shows the spring made in the form of a pyramidic spiral to adapt it to adjust itself to different loads. Fig. 5 is a top view of my spring, showing alternating straight sections and recurvatures having a safe diameter, which in large bars should be not less than once and a half the diameter of the steel of which the spring is made and in small bars three or four times the diameter of the steel. Figs. 6 and 7 represent my present invention and the way in which I combine my new spring for utilizing its lateral strength and its free vibratory action in wheeled vehicles.

I find by experience that a less diameter of recurvature than that above stated injures the quality of the steel, and it is very important that such proportions of recurvatures should be carefully observed.

The first and most important objects to attain in such a vehicle are the safety and comfort of passengers. The parts which are usually employed to cushion the vibrations of the wheels are necessarily the weakest, and therefore the most liable to break, especially from horizontal forces, and the imperfect construction heretofore adopted has not attained the degree of strength in said horizontal direction, and at the same time the degree of delicacy of vibration required to properly cushion the jars and vibrations of the wheels. I have found by a long experience that a spring adapted to utilize the torsional action upon the steel is the most delicate and the most permanent in its elasticity; but in the torsion-spring patented by me May 2, 1855, No. 12,510, (shown in Fig. 1,) and in my improved recurved torsion-spring patented June 24, 1884, No. 300,976, (shown in Fig. 2,) I found that, especially when carrying heavy loads, the friction on the journals of the springs was so great that it destroyed the fine vibratory action which would adapt the torsion-spring peculiarly to passenger wheeled vehicles if it could be utilized successfully. To accomplish this result without sacrificing horizontal strength of the parts has been the object of my present invention, as shown in Figs. 6 and 7, in which all of the delicate vibration of the straight torsion-spring is combined with ample horizontal strength to absorb and resist the vertical and horizontal vibrations of the wheels to such a degree that the ordinary obstacles encountered by such a vehicle are passed over with entire safety and comfort to the passengers. I find, also, that the durability of the vehicle is promoted by the same vibratory delicacy of the springs, and that if the springs are properly guarded against diagonal forces to assure adequate horizontal strength the more delicate the springs the longer the vehicle will last.

There are many difficulties in the way of making a spiral torsion-spring that will attain all of the elastic elements of a straight torsion-spring and at the same time possess the strength and reliability required in carrying a load on a wheeled vehicle, as the corners of the spring must be properly rounded to prevent the fracture of the steel on a circle at least once and a half the diameter of the steel in large bars and three or four times the diameter in small bars, and the sides of the spring must be of substantially uniform length to attain uniform action and strain upon the steel, and the natural recoil of the steel, upon being bent, will throw the sides of the spring out of parallel if made in any ordinary spring-bending machine. These and other difficulties have made it necessary for me to devise new and special machinery therefor, which machinery will be more fully described in a separate application for a patent, and I only claim in this application the peculiar combinations in a wheeled vehicle as above described.

I am aware that an oblong spiral wire frame for supporting an oiling device has heretofore been made and a wire has been wound around a flat piece of iron to act as a spring in a thill attachment; but as neither of these devices would combine the essential elements of a straight-sided torsion-spring in spiral form with the uniform sides and rounded corners, as I have above described and shown, and as they would not meet the requirements of my invention, I do not claim to cover such devices; but,

Having now described my invention, I claim as new—

1. A torsion-spring made in spiral and recurved form, and having straight and substantially equal side sections united by rounded corners, in combination with and interposed between a vehicle-body and its wheels, substantially as and for the purposes described.

2. The recurved spiral torsion-spring having straight sides and rounded corners, in combination with a pivoted supporting-link arranged at right angles to the adjacent straight side of said spring, whereby excessive diagonal strains on the spring are prevented, substantially as specified.

In testimony whereof I have hereunto set my hand this 13th day of December, A. D. 1888.

MOSES G. HUBBARD.

Witnesses:
WALTER B. MCBRIDE,
GEO. W. BROAS.